United States Patent
Sato et al.

(10) Patent No.: US 9,921,682 B2
(45) Date of Patent: Mar. 20, 2018

(54) TOUCH PANEL HAVING HIGH RESISTANCE TO STATIC ELECTRICITY

(71) Applicant: JAPAN AVIATION ELECTRONICS INDUSTRY, LIMITED, Tokyo (JP)

(72) Inventors: Mitsunori Sato, Tokyo (JP); Osamu Hirata, Tokyo (JP); Daisuke Hiraoka, Tokyo (JP); Joji Akizuki, Tokyo (JP); Yutaka Takezawa, Tokyo (JP); Hiroshi Okumura, Tokyo (JP); Yutaro Kogawa, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 77 days.

(21) Appl. No.: 15/220,638

(22) Filed: Jul. 27, 2016

(65) Prior Publication Data
US 2017/0090652 A1 Mar. 30, 2017

(30) Foreign Application Priority Data
Sep. 30, 2015 (JP) .................. 2015-192855

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 2203/04107* (2013.01); *G06F 2203/04112* (2013.01)

(58) Field of Classification Search
CPC ...... G06F 1/1643; G06F 1/169; G06F 1/1692; G06F 3/03547; G06F 3/041–3/0418; G06F 3/0421; G06F 3/0426–3/0428; G06F 3/0488–3/04886; G06F 2203/04101–2203/04113
See application file for complete search history.

(56) References Cited

U.S. PATENT DOCUMENTS

| | | | |
|---|---|---|---|
| 9,270,056 B2 | 2/2016 | Higuchi et al. | |
| 2010/0220071 A1 | 9/2010 | Nishihara et al. | |
| 2015/0199054 A1* | 7/2015 | Kikuchi | G06F 3/045 345/174 |
| 2015/0338959 A1* | 11/2015 | Xie | G06F 3/044 345/174 |

FOREIGN PATENT DOCUMENTS

JP    2010-218542 A    9/2010

* cited by examiner

*Primary Examiner* — Sanghyuk Park
(74) *Attorney, Agent, or Firm* — Greenblum & Bernstein, P.L.C.

(57) ABSTRACT

In a touch panel in which a sensor electrode array, frame wiring set that is located outside the sensor electrode array and connected to the sensor electrode array, and a first outer ground wiring line located outside the frame wiring set are formed on a transparent substrate of the touch panel, shielding wiring covering the frame wiring set is provided, with an insulating layer placed between the frame wiring set and the shielding wiring, and a second outer ground wiring line is provided outside the shielding wiring. The shielding wiring is connected to a ground wiring line included in the frame wiring set through a hole formed in the insulating layer and is insulated from the second outer ground wiring line.

16 Claims, 7 Drawing Sheets

TOUCH PANEL HAVING HIGH RESISTANCE TO STATIC ELECTRICITY

TECHNICAL FIELD

The present invention relates to touch panels and, in particular, to a touch panel that has high resistance to static electricity.

BACKGROUND ART

Figure 1A:
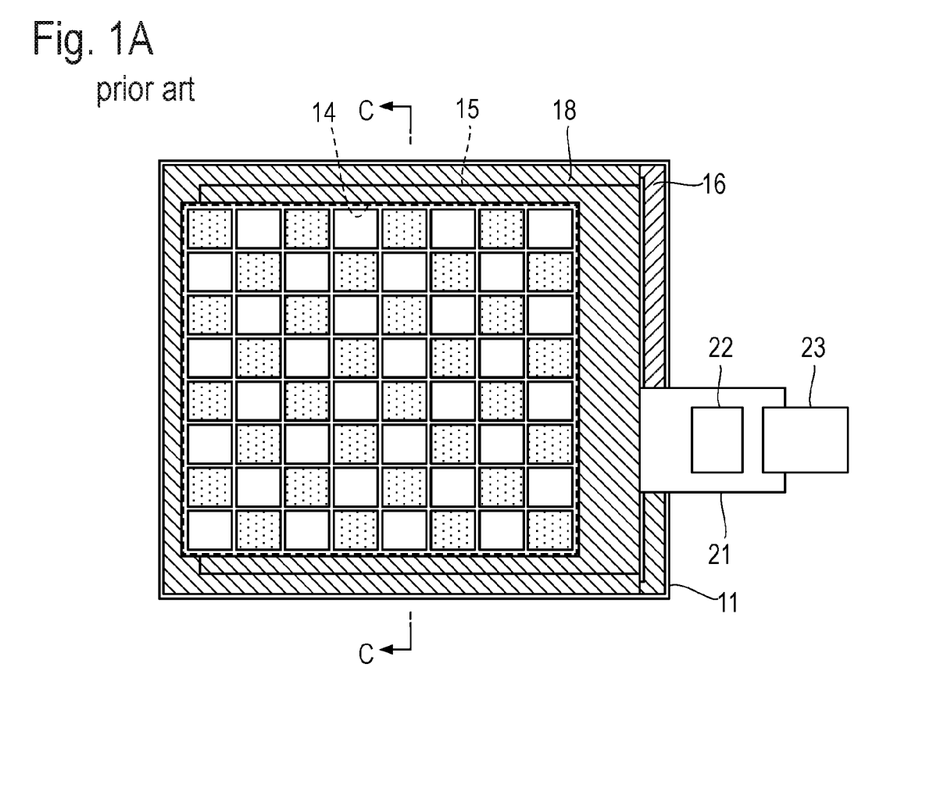
FIG. 1A is a plan view depicting an existing example of a touch panel.
Figure 1B:
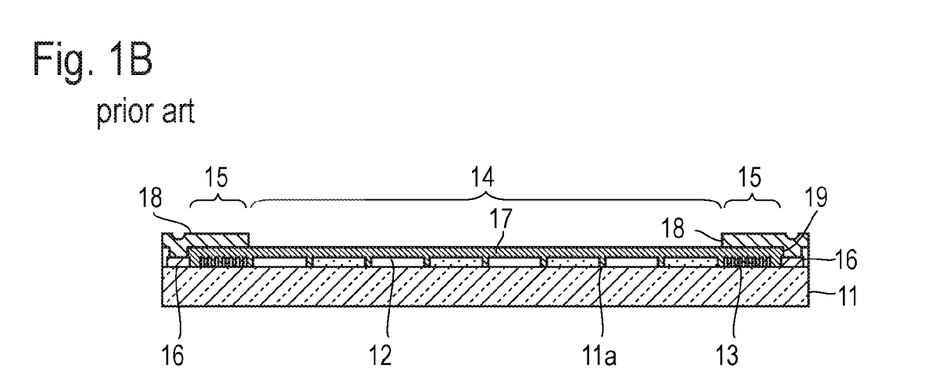
FIG. 1B is an enlarged sectional view of the touch panel depicted in FIG. 1A, the enlarged sectional view taken along the line C-C depicted in FIG. 1A.

FIGS. 1A and 1B depict the structure of a capacitance type touch panel which is described in Japanese Patent Application Laid Open No. 2010-218542 (hereinafter referred to as "Patent Literature 1") as an existing example of a touch panel.

On a front surface 11a of a substrate 11, detection electrodes 12 and wiring electrodes 13 electrically connected to the detection electrodes 12 are formed. The wiring electrodes 13 transmit a detected signal to an external circuit. The detection electrodes 12 are formed on a part of the substrate 11 excepting the marginal region thereof to define a detection region 14, and the wiring electrodes 13 are collectively formed outside the detection region 14 to define a wiring region 15. Outside a region including the detection region 14 and the wiring region 15, that is, in the outer periphery of the substrate 11, a first shielding electrode 16 is formed.

An insulating layer 17 is formed on the detection region 14, the wiring region 15 and the first shielding electrode 16. A second shielding electrode 18 is formed on a top surface of the insulating layer 17 so as to cover the wiring region 15 and the first shielding electrode 16. The second shielding electrode 18 is electrically connected to the first shielding electrode 16 via a through hole 19 formed in the insulating layer 17. The first shielding electrode 16 is connected to a GND not shown in the drawings.

The wiring electrodes 13 are collected at a right-hand side end of the substrate 11 to form a terminal portion (which is hidden in FIG. 1A), and one end of a first flexible substrate 21 is connected to the terminal portion. A signal processing IC 22 is mounted on the first flexible substrate 21. A second flexible substrate 23 is connected to the other end of the first flexible substrate 21. The second flexible substrate 23 is connected to a control unit not shown in the drawings.

The touch panel having the above-described structure blocks out the electromagnetic noise invading from an end of the substrate 11 (from a lateral direction of the substrate 11) by the first shielding electrode 16 before the electromagnetic noise reaches the wiring electrodes 13 and the detection electrodes 12 and further blocks out the electromagnetic noise invading from the top surface of the substrate 11 (from above) by the second shielding electrode 18.

As described above, Patent Literature 1 discloses that, by forming the first shielding electrode 16 and the second shielding electrode 18 in the touch panel, the electromagnetic noise invading from the top surface or the end of the substrate 11 is blocked out and further discloses that static electricity is also blocked out.

The insulating layer 17 interposed between the second shielding electrode 18, which is formed to cover the wiring electrodes 13, and the wiring electrodes 13 is thin. When the static electricity applied from the outside moves to a portion of the second shielding electrode 18, for example, the portion facing the wiring electrodes 13, the static electricity may move to the wiring electrodes 13 through a minute pinhole present in the insulating layer 17 or as a result of the occurrence of a dielectric breakdown in the insulating layer 17.

Such a movement of the static electricity to the wiring electrodes 13 becomes a cause of a malfunction. Additionally, if a current flowing in the wiring electrodes 13 due to the static electricity exceeds the allowable current of the wiring electrodes 13, the wiring electrodes 13 will fuse (will be broken down).

SUMMARY OF THE INVENTION

In view of the problem described above, an object of the present invention is to provide a touch panel that has high resistance to static electricity and has a high degree of electromagnetic compatibility (EMC).

A touch panel of the present invention is a touch panel in which a sensor electrode array, frame wiring set that is located outside the sensor electrode array and connected to the sensor electrode array, and a first outer ground wiring line located outside the frame wiring set are formed on a transparent substrate of the touch panel. The touch panel of the present invention includes shielding wiring covering the frame wiring set, with an insulating layer placed between the frame wiring set and the shielding wiring; and a second outer ground wiring line located outside the shielding wiring. The shielding wiring is connected to a ground wiring line included in the frame wiring set through a hole formed in the insulating layer and is insulated from the second outer ground wiring line.

Effects of the Invention

The touch panel of the present invention has high resistance to static electricity and has a high degree of the EMC.

DETAILED DESCRIPTION

Figures 4A, 4C:
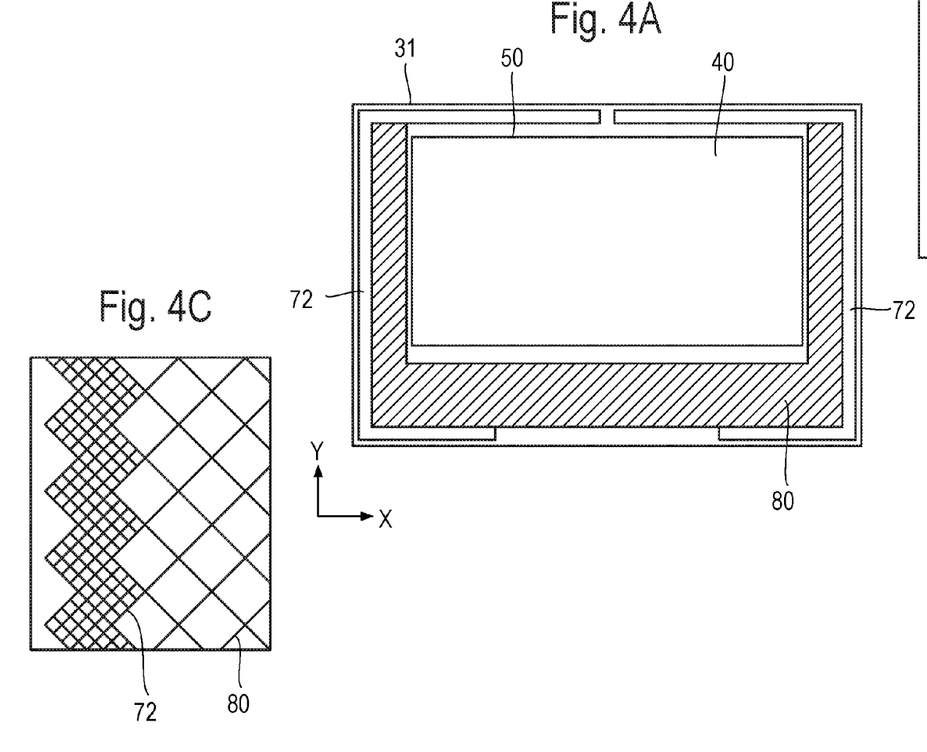
FIG. 4A is a plan view depicting the general outline of the structure of a second conductor layer of the touch panel depicted in FIG. 2A.
FIG. 4C is a partially enlarged view depicting the details of principal portions of the second conductor layer.
Figure 4B:
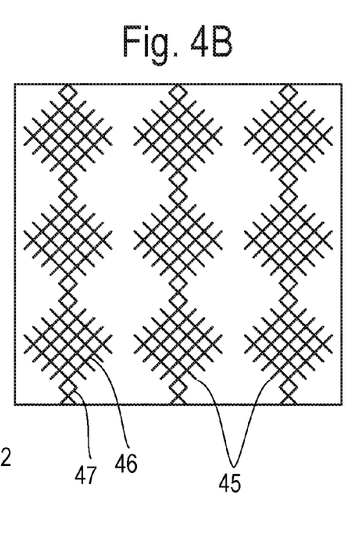
FIG. 4B is a partially enlarged view depicting the details of principal portions of the second conductor layer.
Figure 5:
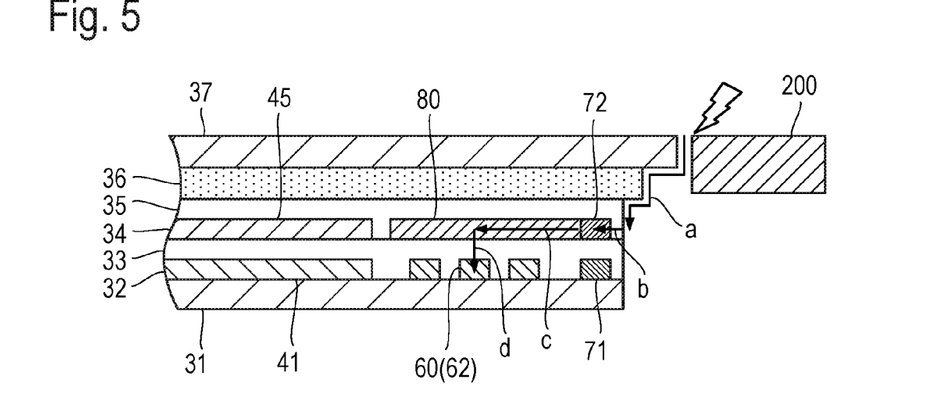
FIG. 5 is a diagram for explaining a first mechanism of a breakdown caused by static electricity.
Figure 6:
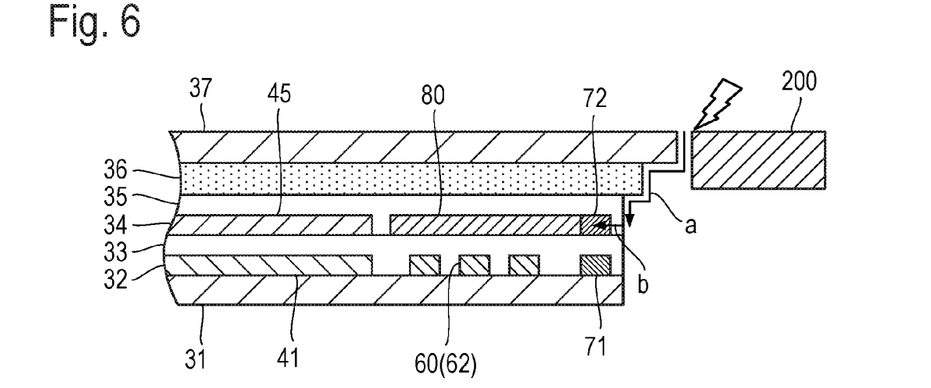
FIG. 6 is a diagram for explaining a second mechanism of a breakdown caused by static electricity.
Figure 7:
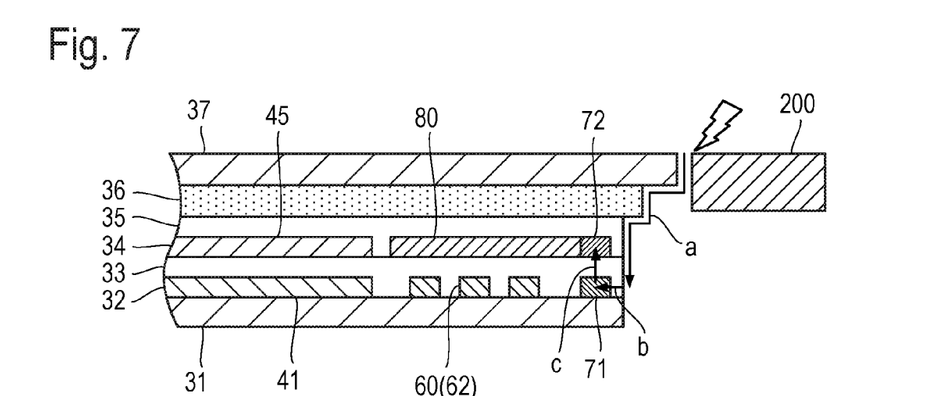
FIG. 7 is a diagram for explaining a third mechanism of a breakdown caused by static electricity.

The structure of a touch panel to which the present invention is not applied will be described with reference to FIGS. 2A to 4C, and mechanisms of a breakdown caused by static electricity will be described in detail with reference to FIGS. 5 to 7.

Figure 2A:
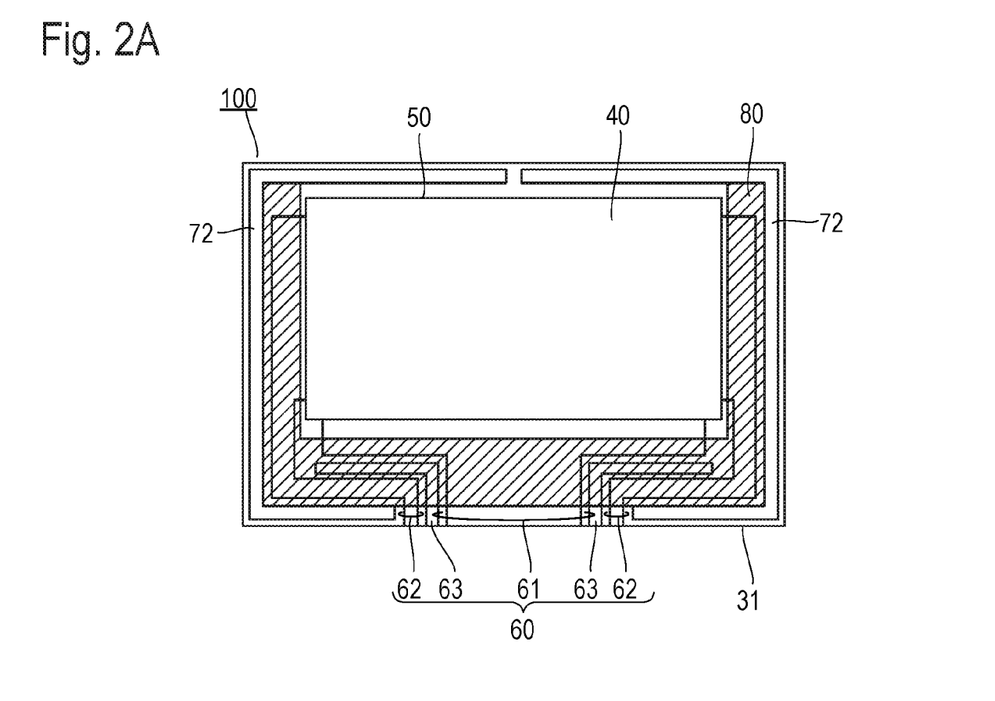
FIG. 2A is a plan view depicting the general outline of a touch panel to which the present invention is not applied.
Figure 2B:
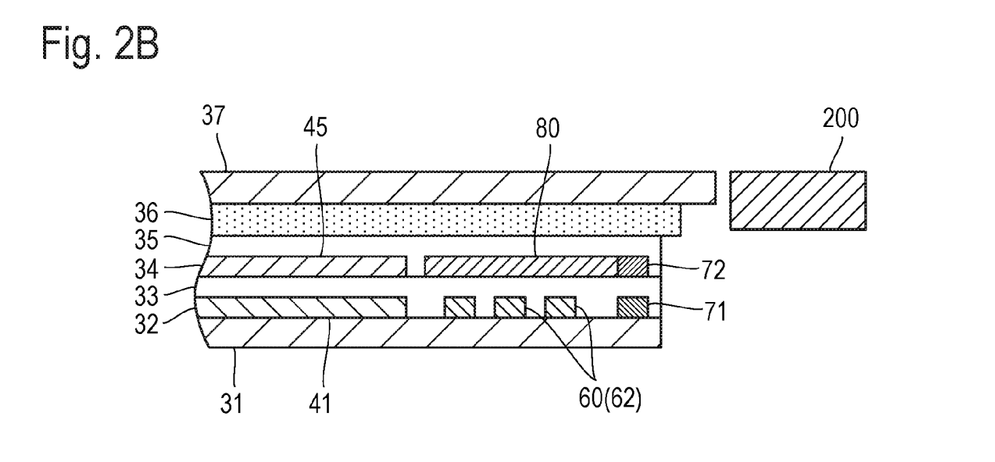
FIG. 2B is a diagram for explaining the sectional structure of the touch panel depicted in FIG. 2A.

A touch panel 100 depicted in FIGS. 2A and 2B is a capacitance type touch panel as is the case with the touch panel depicted in FIGS. 1A and 1B. The touch panel 100 has a structure in which, as depicted in FIG. 2B, a first conductor layer 32, an insulating layer 33, a second conductor layer 34 and a protective film 35 are sequentially stacked on a rectangular transparent substrate 31. Furthermore, a cover 37 is attached to the protective film 35 with an optical clear adhesive (OCA) 36. The transparent substrate 31 is formed of, for example, polyethylene terephthalate (PET) or polycarbonate (PC), and the cover 37 is formed of, for example, PC. As the insulating layer 33 and the protective film 35, acrylic resin or epoxy resin is used. In FIG. 2A, the cover 37 and the OCA 36 are not depicted.

Though not depicted in detail in FIGS. 2A and 2B, a sensor electrode array 40 includes first sensor electrode rows 41 and second sensor electrode columns 45. The first sensor electrode rows 41 are formed from the first conductor layer 32 and the second sensor electrode columns 45 are formed from the second conductor layer 34 which is insulated from the first conductor layer 32 by the insulating layer 33. In FIG. 2A, a portion surrounded by a rectangular frame indicates a sensor region 50 in which the sensor electrode array 40 is located. In FIG. 2B, reference numeral 200 indicates a housing to which this touch panel 100 is attached. The housing 200 is generally formed of resin.

Figures 3A, 3B:
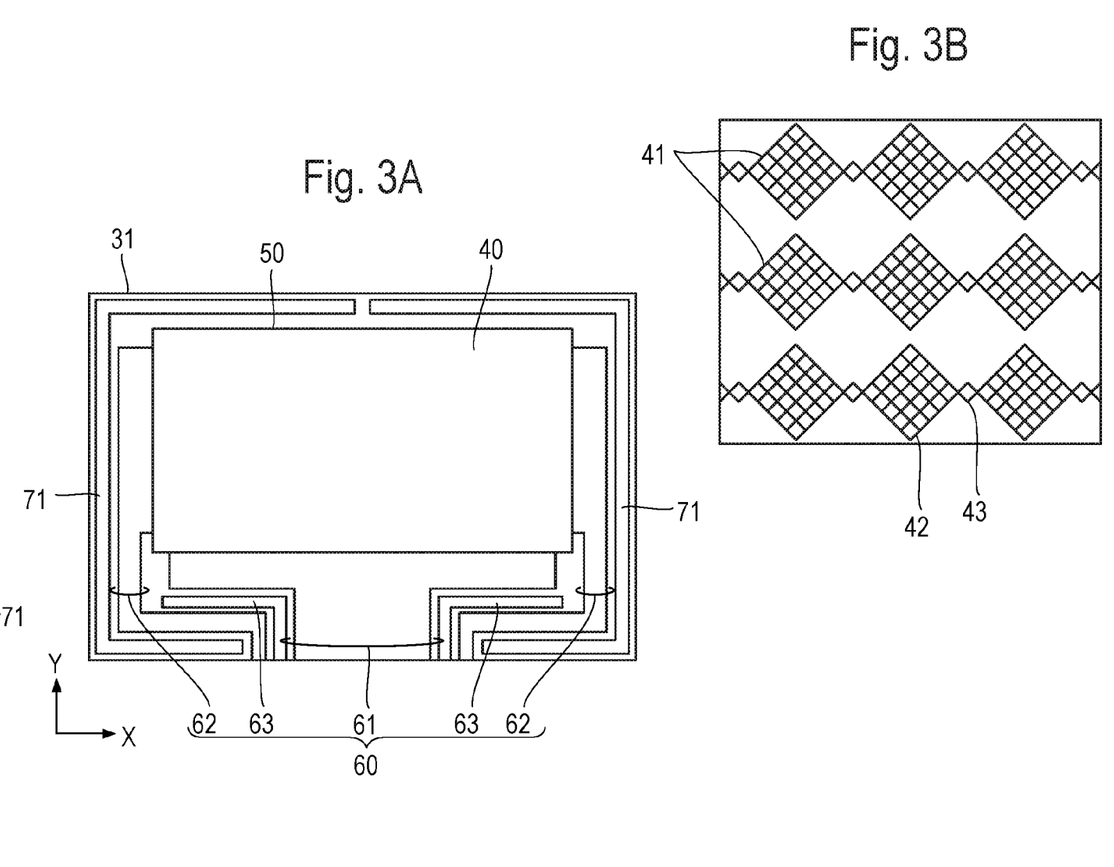
FIG. 3A is a plan view depicting the general outline of the structure of a first conductor layer of the touch panel depicted in FIG. 2A.
FIG. 3B is a partially enlarged view depicting the details of principal portions of the first conductor layer.
Figure 3C:
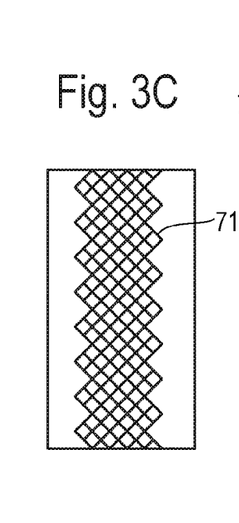
FIG. 3C is a partially enlarged view depicting the details of principal portions of the first conductor layer.

FIGS. 3A to 3C indicate the placement and shapes of the first sensor electrode rows 41, a frame wiring set 60 and first outer ground wiring lines 71 which are all formed from the first conductor layer 32. FIGS. 4A to 4C indicate the placement and shapes of the second sensor electrode columns 45, a shielding wiring 80, and second outer ground wiring lines 72 which are all formed from the second conductor layer 34. In FIG. 2A and FIGS. 4A to 4C, the shielding wiring 80 is indicated by hatching.

The first sensor electrode rows 41 each include island electrodes 42 and coupling portions 43, the island electrodes 42 being arranged in an X direction parallel to the long side of the transparent substrate 31 and the coupling portions 43 coupling the adjacent island electrodes 42. The first sensor electrode rows 41 are juxtaposed to each other in a Y direction parallel to the short side of the transparent substrate 31. The second sensor electrode columns 45 each include island electrodes 46 and coupling portions 47, the island electrodes 46 being arranged in the Y direction and the coupling portions 47 coupling the adjacent island electrodes 46. The second sensor electrode columns 45 are juxtaposed to each other in the X direction. The first sensor electrode rows 41 and the second sensor electrode columns 45 cross each other in a state in which the first sensor electrode rows 41 and the second sensor electrode columns 45 are insulated from each other, and the coupling portions 47 are located in positions where the coupling portions 47 overlap with the coupling portions 43. The island electrodes 42 and 46 each have a rhombic outside shape.

As depicted in FIG. 3A, the frame wiring set 60 is provided outside (on the periphery of) the sensor electrode array 40. The frame wiring set 60 includes transmission wiring lines 61 and reception wiring lines 62. The frame wiring set 60 also includes ground wiring lines 63 for separation of transmission and reception wiring, the ground wiring lines 63 separating the transmission wiring lines 61 and the reception wiring lines 62 from each other. In this example, each of both ends positioned in the X direction of each first sensor electrode row 41 is connected to a corresponding one of the reception wiring lines 62, and the transmission wiring lines 61 are each connected to a corresponding one end positioned in the Y direction of each second sensor electrode column 45. In FIGS. 2A and 3A, with respect to the transmission wiring lines 61 and the reception wiring lines 62 which are drawn from the sensor electrode array 40, only the transmission wiring lines 61 and the reception wiring lines 62 located at both ends of the array are depicted and the other lines of the transmission wiring lines 61 and the reception wiring lines 62 are not depicted in the drawings. Whether the first sensor electrode rows 41 are set for use as a reception as described above or for use as a transmission is determined by an external signal processing IC, and the transmission wiring lines 61 may serve as reception wiring lines and the reception wiring lines 62 may serve as transmission wiring lines in accordance with the signal processing IC.

The transmission wiring lines 61 and the reception wiring lines 62 are formed so as to extend to the center of one long side (the lower side) of the transparent substrate 31 and an area near that center. The ground wiring lines 63 for separation of transmission and reception wiring are provided between the arrangement of the transmission wiring lines 61 and the arrangement of the reception wiring lines 62 on the side where the lower side of the transparent substrate 31 is located. As is the case with the transmission wiring lines 61 and the reception wiring lines 62, the ground wiring lines 63 for separation of transmission and reception wiring are formed so as to extend to an area near the center of the lower side of the transparent substrate 31.

The first outer ground wiring lines 71 are provided outside the frame wiring set 60 and located on the outer edge of the transparent substrate 31. The first outer ground wiring lines 71 are formed so as to surround the frame wiring set 60 and the sensor electrode array 40 except for the central part of the lower side of the transparent substrate 31. The first outer ground wiring lines 71 are separated by a slight space at the center of the upper side of the transparent substrate 31.

As depicted in FIG. 4A, the shielding wiring 80 is provided outside the sensor electrode array 40. The shielding wiring 80 is located over the frame wiring set 60, with the insulating layer 33 placed therebetween. The frame wiring set 60 is covered with the shielding wiring 80 (see FIG. 2B).

The second outer ground wiring lines 72 are provided outside the shielding wiring 80. The second outer ground wiring lines 72 have the same shape as the first outer ground wiring lines 71 and are located above the first outer ground wiring lines 71, with the insulating layer 33 placed therebetween. The shielding wiring 80 and each of the second outer ground wiring lines 72 are connected to each other and brought into conduction.

The first outer ground wiring lines 71, the second outer ground wiring lines 72 and the frame wiring set 60 are each connected to an external circuit substrate in the central part of the lower side of the transparent substrate 31.

In the above-described structure, as depicted in FIGS. 3A to 3C and FIGS. 4A to 4C, the first sensor electrode rows 41 and the second sensor electrode columns 45 are meshes of conductor fine lines in this example and are formed by printing. That is, in this example, the first and second conductor layers 32 and 34 are formed by printing, and the first outer ground wiring lines 71, the second outer ground wiring lines 72 and the ground wiring lines 63 for separation of transmission and reception wiring are also mesh wiring, not thick solid wiring, from the viewpoint of printability. In this example, the transmission wiring lines 61 and the reception wiring lines 62 are each a thin line, but may be mesh wiring.

By using a printing method as described above, a complicated process of forming a film of indium tin oxide (ITO) by sputtering and then performing etching as in the case where the transparent electrode is formed of ITO becomes unnecessary, which makes it possible to reduce the number of man-hours and achieve cost reduction.

Printing of the first and second conductor layers 32 and 34 is performed by gravure offset printing using conductive ink such as silver, which makes it possible to form good meshes of fine line widths. The aperture ratio of each mesh of the first outer ground wiring lines 71, the second outer ground wiring lines 72 and the ground wiring lines 63 for separation of transmission and reception wiring is smaller than the aperture ratio of the mesh of the shielding wiring 80. More specifically, as depicted in FIG. 4C, each mesh of the first outer ground wiring lines 71, the second outer ground wiring lines 72 and the ground wiring lines 63 for separation of transmission and reception wiring and the mesh of the shielding wiring 80 have the same line width, but the line interval (the width of the space between lines) of each mesh of the first outer ground wiring lines 71, the second outer ground wiring lines 72 and the ground wiring lines 63 for separation of transmission and reception wiring is smaller than the line interval of the mesh of the shielding wiring 80. That is, the mesh pitch of each mesh of the first outer ground wiring lines 71, the second outer ground wiring lines 72 and the ground wiring lines 63 for separation of transmission and reception wiring is smaller than the mesh pitch of the mesh of the shielding wiring 80.

In the touch panel 100 having the above-described structure, the first outer ground wiring lines 71 and the second outer ground wiring lines 72 protect the frame wiring set 60 by absorbing the electromagnetic noise which invades the touch panel 100 from a direction parallel to the board surface of the transparent substrate 31 and thereby prevent a malfunction of the touch panel 100, and further prevent a malfunction of an external device by absorbing the electromagnetic noise which radiates from the touch panel 100 to the outside in the direction parallel to the board surface of the transparent substrate 31.

Moreover, the first outer ground wiring lines 71 and the second outer ground wiring lines 72 play a role in leading the static electricity which has invaded the touch panel 100 to the external circuit substrate in order to prevent the frame wiring set 60, for example, from being broken down by electrostatic discharge (ESD) caused by user's touching of the touch panel 100.

The shielding wiring 80 protects the frame wiring set 60 by absorbing the electromagnetic noise which invades the touch panel 100 from a direction perpendicular to the board surface of the transparent substrate 31 and thereby prevents a malfunction of the touch panel 100, and further prevents a malfunction of the external device by absorbing the electromagnetic noise which radiates from the touch panel 100 to the outside in the direction perpendicular to the board surface of the transparent substrate 31.

As described above, the touch panel 100 has the EMC, that is, has electromagnetic susceptibility (EMS), which is electromagnetic resistance, and electromagnetic incoherence, which does not allow electromagnetic interference (EMI) to arise. Further, the touch panel 100 has been considered to have also resistance to static electricity.

However, the results of the test of application of highly charged static electricity which was performed on the above-described touch panel 100 revealed that resistance to static electricity was not sufficient and a breakdown caused by fusion of the frame wiring set 60 or the shielding wiring 80 occurred. Furthermore, it was also revealed that a breakdown caused by fusion of the first outer ground wiring lines 71 and the second outer ground wiring lines 72 also occurred, though the probability of occurrence was lower than the probability of occurrence of a breakdown of the frame wiring set 60 or the shielding wiring 80. FIGS. 5 to 7 depict examples of this mechanism of the breakdown. Hereinafter, with reference to FIGS. 5 to 7, the mechanism of the breakdown caused by the static electricity application test will be described. In the test, ±18 kV static electricity was applied to the touch panel 100 by a discharge gun.

(1) Fusion of the frame wiring set 60 (FIG. 5)
  a) The static electricity invades through a space between the cover 37 and the housing 200;
  b) The static electricity moves to the second outer ground wiring lines 72 through a minute pinhole present in the protective film 35 or as a result of the occurrence of a dielectric breakdown in the protective film 35;
  c) The static electricity moves to the shielding wiring 80 connected to the second outer ground wiring lines 72;
  d) The static electricity moves to the frame wiring set 60 through a minute pinhole present in the insulating layer 33 or as a result of the occurrence of a dielectric breakdown in the insulating layer 33; and
  e) A current flowing through the frame wiring set 60 due to the static electricity exceeds the allowable current of the frame wiring set 60, resulting in fusion of the frame wiring set 60.

(2) Fusion of the second outer ground wiring lines 72 (Pattern 1: FIG. 6)
  a) The static electricity invades through a space between the cover 37 and the housing 200;
  b) The static electricity moves to the second outer ground wiring lines 72 through a minute pinhole present in the protective film 35 or as a result of the occurrence of a dielectric breakdown in the protective film 35; and
  c) A current flowing through the second outer ground wiring lines 72 due to the static electricity exceeds the allowable current of the second outer ground wiring lines 72, resulting in fusion of the second outer ground wiring lines 72.

(3) Fusion of the second outer ground wiring lines 72 (Pattern 2: FIG. 7)
  a) The static electricity invades through a space between the cover 37 and the housing 200;
  b) The static electricity moves to the first outer ground wiring lines 71 through a minute pinhole present in the insulating layer 33 or as a result of the occurrence of a dielectric breakdown in the insulating layer 33;
  c) The static electricity moves to the second outer ground wiring lines 72 from the first outer ground wiring lines 71 through a minute pinhole present in the insulating layer 33 or as a result of the occurrence of a dielectric breakdown in the insulating layer 33; and d) A current flowing through the second outer ground wiring lines 72 due to the static electricity exceeds allowable current of the second outer ground wiring lines 72, resulting in fusion of the second outer ground wiring lines 72.

While the mechanism of a breakdown of each of the frame wiring 60 and the second outer ground wiring 72 has been described above, a breakdown also occurs in the first outer ground wiring lines 71 or the shielding wiring 80 by the same mechanism. The breakdown phenomenon of the frame wiring set 60 described in (1) above becomes pronounced with a reduction in the thickness of the insulating layer 33 covering the frame wiring set 60. However, since the touch panel 100 is required to have transparency, it is desirable that the insulating layer 33 is thin. Therefore, it is not a practical option to increase the thickness of the insulating layer 33 more than necessary.

The above-mentioned second shielding electrode 18 in the touch panel described in Patent Literature 1 depicted in FIGS. 1A and 1B corresponds to a group of the shielding wiring 80 and the second outer ground wiring lines 72 connected to the shielding wiring 80 in the above-described touch panel 100. Thus, also in the existing touch panel depicted in FIGS. 1A and 1B, the phenomenon that the wiring electrodes 13 fuse and are broken down by the same mechanism as the mechanism described in (1) above may occur.

Next, an embodiment of a touch panel according to the present invention, for which measures against the above-described mechanism of a breakdown have been taken, will be described.

Figure 8:
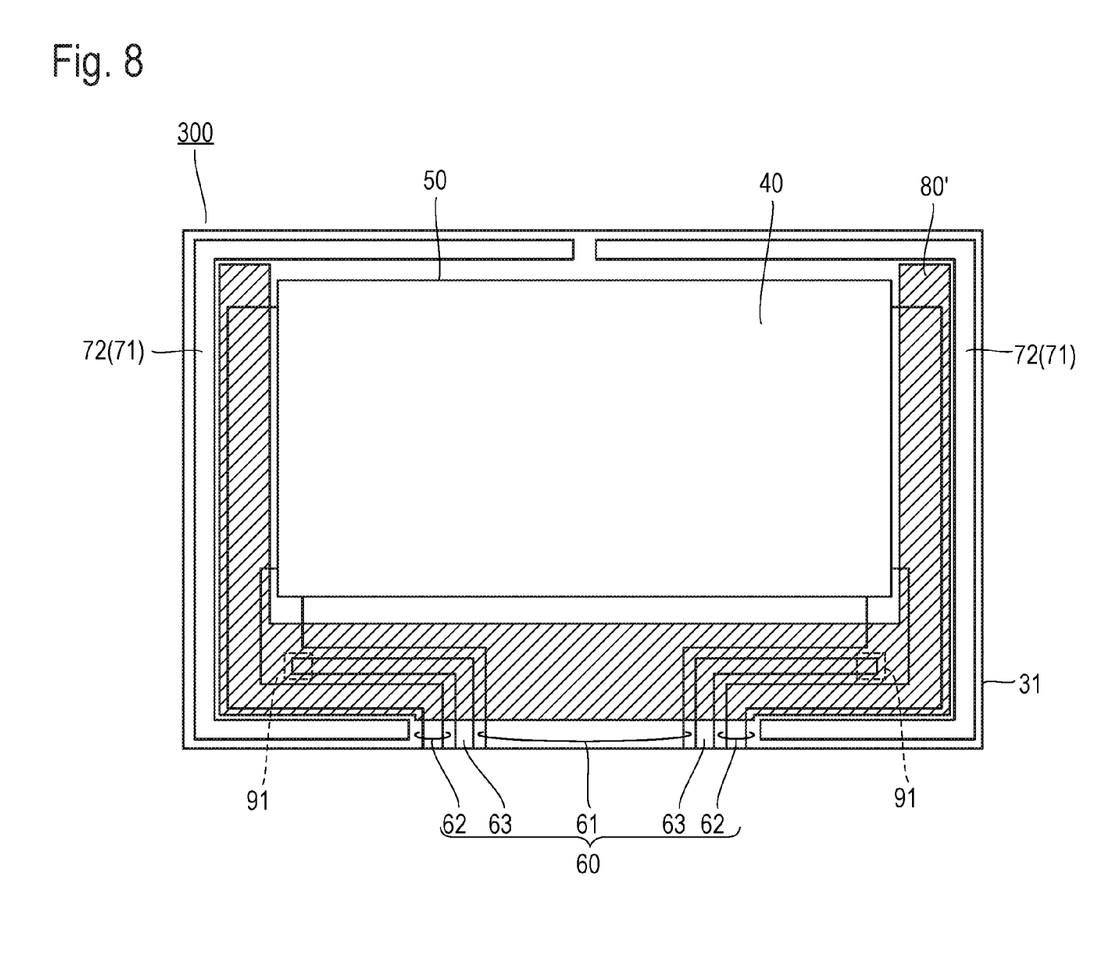
FIG. 8 is a plan view depicting the general outline of the structure of a first embodiment of a touch panel according to the present invention.

FIG. 8 depicts a first embodiment of the touch panel according to the present invention. Portions corresponding to the component elements of the touch panel 100 depicted in FIGS. 2A to 4C are identified with the same reference numerals and detailed descriptions thereof are omitted.

In a touch panel 300 depicted in FIG. 8, a space is provided as depicted in FIG. 8 between shielding wiring 80' indicated by hatching and the second outer ground wiring lines 72, whereby the shielding wiring 80' is separated and insulated from the second outer ground wiring lines 72. In addition, the shielding wiring 80' is connected to the ground wiring lines 63 for separation of transmission and reception wiring. In the insulating layer 33, holes 91 indicated by dashed lines in FIG. 8 are provided, and, in the positions of the holes 91, the shielding wiring 80' is connected to the ground wiring lines 63 for separation of transmission and reception wiring.

With such a structure, it is possible to prevent the static electricity from moving to the shielding wiring 80' as in the mechanism described in (1) above and thereby prevent a breakdown of the frame wiring set 60 and the shielding wiring 80' caused by the static electricity. A portion of the shielding wiring 80', at which the shielding wiring 80' is connected to the ground wiring lines 63 for separation of transmission and reception wiring, may have a smaller mesh pitch, for example.

Figure 9:
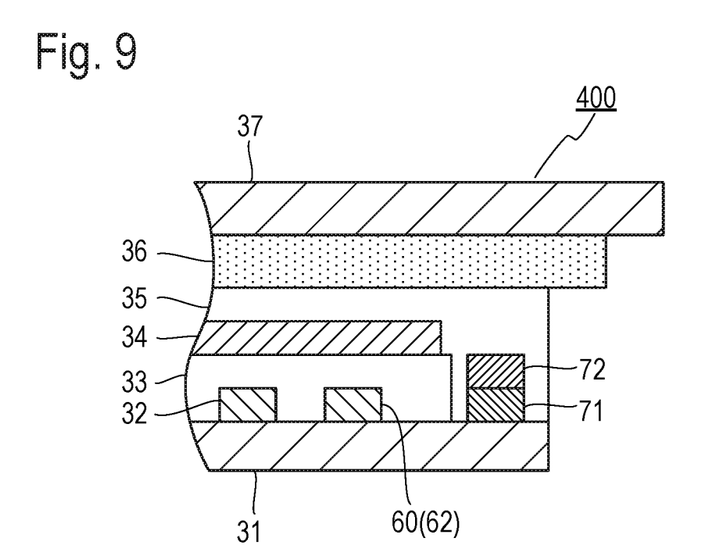
FIG. 9 is a diagram for explaining the sectional structure of principal portions of a second embodiment of the touch panel according to the present invention.

Next, a second embodiment of the touch panel according to the present invention will be described with reference to FIG. 9.

In the touch panel 300 of the above-described first embodiment, as is the case with the touch panel 100 depicted in FIG. 2B, the second outer ground wiring lines 72 are located above the first outer ground wiring lines 71, with the insulating layer 33 placed therebetween. However, in a touch panel 400 of the second embodiment, the first outer ground wiring lines 71 and the second outer ground wiring lines 72 are formed by overprinting and therefore the insulating layer 33 is not interposed between the first outer ground wiring lines 71 and the second outer ground wiring lines 72. It is simply necessary to perform overprinting by setting (limiting) the position in which the insulating layer 33 is formed by printing such that, as depicted in FIG. 9, the first outer ground wiring lines 71 are not covered with the insulating layer 33, and the second outer ground wiring lines 72 are located directly on the first outer ground wiring lines 71 and connected to the first outer ground wiring lines 71.

With such a structure, the first outer ground wiring lines 71 and the second outer ground wiring lines 72 are integrated together and the cross-sectional area is increased and the allowable current is increased, whereby it is possible to prevent a breakdown of the first outer ground wiring lines 71 and the second outer ground wiring lines 72 caused by the mechanism described in (2) or (3) above. The structure other than the first outer ground wiring lines 71 and the second outer ground wiring lines 72 which are connected to each other is the same as the structure of the touch panel 300 of the first embodiment depicted in FIG. 8.

Although the structures of the touch panels 300 and 400 described above are changed from the structure of the touch panel 100 depicted in FIGS. 2A to 4C, the number of production man-hours of the touch panels 300 or 400 is not increased by the above changes.

The embodiments of the present invention have been described above, but the sensor electrode array 40, for example, may be formed by sputtering of ITO or the like. However, in order to achieve cost reduction, it is preferable to use the printing method as in the embodiments described above and perform collective formation of the first sensor electrode rows 41, the frame wiring set 60, and the first outer ground wiring lines 71 and collective formation of the second sensor electrode columns 45, the shielding wiring 80', and the second outer ground wiring lines 72.

When printing using conductive ink such as silver is performed, the sensor electrode array 40 is shaped in the form of a mesh, and, as described earlier, it is preferable that the first outer ground wiring lines 71, the second outer ground wiring lines 72 and so forth are also shaped as mesh-like thick wiring from the viewpoint of printability. However, since the mesh wiring increases the resistance value and makes it more likely that fusion by the mechanisms described in (2) or (3) above occurs, integrating the first outer ground wiring lines 71 and the second outer ground wiring lines 72 by stacking the first outer ground wiring lines 71 and the second outer ground wiring lines 72 is highly effective when the first outer ground wiring lines 71 and the second outer ground wiring lines 72 are mesh wiring.

The foregoing description of the embodiments of the invention has been presented for the purpose of illustration and description. It is not intended to be exhaustive or to limit the invention to the precise form disclosed. Modifications or variations are possible in light of the above teachings. The embodiment was chosen and described to provide the illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A touch panel in which a sensor electrode array, frame wiring set that is located outside the sensor electrode array and connected to the sensor electrode array, and a first outer ground wiring line located outside the frame wiring set are formed on a transparent substrate of the touch panel, comprising:
    shielding wiring covering the frame wiring set, with an insulating layer placed between the frame wiring set and the shielding wiring; and
    a second outer ground wiring line located outside the shielding wiring,
    wherein
    the shielding wiring is connected to a ground wiring line included in the frame wiring set through a hole formed in the insulating layer, and
    the shielding wiring is insulated from the second outer ground wiring line.

2. The touch panel according to claim 1, wherein
the second outer ground wiring line is located directly on the first outer ground wiring line and connected to the first outer ground wiring line.

3. The touch panel according to claim 2, wherein
the sensor electrode array includes first sensor electrode rows formed from a first conductor layer and second sensor electrode columns formed from a second conductor layer,
the frame wiring set and the first outer ground wiring line are formed from the first conductor layer, and
the shielding wiring and the second outer ground wiring line are formed from the second conductor layer.

4. The touch panel according to claim 3, wherein
the ground wiring line included in the frame wiring set is a ground wiring line for separation of transmission and reception wiring, the ground wiring line separating transmission wiring lines and reception wiring lines which are included in the frame wiring set.

5. The touch panel according to claim 4, wherein
each of the shielding wiring, the first outer ground wiring line, the second outer ground wiring line and the ground wiring line included in the frame wiring set is a mesh of conductor fine lines, and
an aperture ratio of the mesh of each of the first outer ground wiring line, the second outer ground wiring line and the ground wiring line included in the frame wiring set is smaller than an aperture ratio of the mesh of the shielding wiring.

6. The touch panel according to claim 3, wherein
each of the shielding wiring, the first outer ground wiring line, the second outer ground wiring line and the ground wiring line included in the frame wiring set is a mesh of conductor fine lines, and
an aperture ratio of the mesh of each of the first outer ground wiring line, the second outer ground wiring line and the ground wiring line included in the frame wiring set is smaller than an aperture ratio of the mesh of the shielding wiring.

7. The touch panel according to claim 2, wherein
the ground wiring line included in the frame wiring set is a ground wiring line for separation of transmission and reception wiring, the ground wiring line separating transmission wiring lines and reception wiring lines which are included in the frame wiring set.

8. The touch panel according to claim 7, wherein
each of the shielding wiring, the first outer ground wiring line, the second outer ground wiring line and the ground wiring line included in the frame wiring set is a mesh of conductor fine lines, and
an aperture ratio of the mesh of each of the first outer ground wiring line, the second outer ground wiring line and the ground wiring line included in the frame wiring set is smaller than an aperture ratio of the mesh of the shielding wiring.

9. The touch panel according to claim 2, wherein
each of the shielding wiring, the first outer ground wiring line, the second outer ground wiring line and the ground wiring line included in the frame wiring set is a mesh of conductor fine lines, and
an aperture ratio of the mesh of each of the first outer ground wiring line, the second outer ground wiring line and the ground wiring line included in the frame wiring set is smaller than an aperture ratio of the mesh of the shielding wiring.

10. The touch panel according to claim 1, wherein
the sensor electrode array includes first sensor electrode rows formed from a first conductor layer and second sensor electrode columns formed from a second conductor layer,
the frame wiring set and the first outer ground wiring line are formed from the first conductor layer, and
the shielding wiring and the second outer ground wiring line are formed from the second conductor layer.

11. The touch panel according to claim 10, wherein
the ground wiring line included in the frame wiring set is a ground wiring line for separation of transmission and reception wiring, the ground wiring line separating transmission wiring lines and reception wiring lines which are included in the frame wiring set.

12. The touch panel according to claim 11, wherein
each of the shielding wiring, the first outer ground wiring line, the second outer ground wiring line and the ground wiring line included in the frame wiring set is a mesh of conductor fine lines, and
an aperture ratio of the mesh of each of the first outer ground wiring line, the second outer ground wiring line and the ground wiring line included in the frame wiring set is smaller than an aperture ratio of the mesh of the shielding wiring.

13. The touch panel according to claim 10, wherein
each of the shielding wiring, the first outer ground wiring line, the second outer ground wiring line and the ground wiring line included in the frame wiring set is a mesh of conductor fine lines, and
an aperture ratio of the mesh of each of the first outer ground wiring line, the second outer ground wiring line, and the ground wiring line included in the frame wiring set is smaller than an aperture ratio of the mesh of the shielding wiring.

14. The touch panel according to claim 1, wherein
the ground wiring line included in the frame wiring set is a ground wiring line for separation of transmission and reception wiring, the ground wiring line separating transmission wiring lines and reception wiring lines which are included in the frame wiring set.

15. The touch panel according to claim 14, wherein
each of the shielding wiring, the first outer ground wiring line, the second outer ground wiring line and the ground wiring line included in the frame wiring set is a mesh of conductor fine lines, and
an aperture ratio of the mesh of each of the first outer ground wiring line, the second outer ground wiring line and the ground wiring line included in the frame wiring set is smaller than an aperture ratio of the mesh of the shielding wiring.

16. The touch panel according to claim 1, wherein each of the shielding wiring, the first outer ground wiring line, the second outer ground wiring line and the ground wiring line included in the frame wiring set is a mesh of conductor fine lines, and an aperture ratio of the mesh of each of the first outer ground wiring line, the second outer ground wiring line and the ground wiring line included in the frame wiring set is smaller than an aperture ratio of the mesh of the shielding wiring.

* * * * *